United States Patent [19]

Rammel

[11] Patent Number: 4,584,110
[45] Date of Patent: Apr. 22, 1986

[54] SIZE COMPOSITIONS FOR GLASS FIBERS

[75] Inventor: Gerald E. Rammel, Newark, Ohio

[73] Assignee: Owens-Corning Fiberglas Corporation, Toledo, Ohio

[21] Appl. No.: 619,235

[22] Filed: Jun. 11, 1984

[51] Int. Cl.$^4$ .......................................... D06M 00/00
[52] U.S. Cl. ................................... 252/8.8; 428/375; 428/378; 524/115
[58] Field of Search ................ 252/8.8; 428/375, 378, 428/392, 389; 106/135

[56] References Cited

U.S. PATENT DOCUMENTS 4,171,403  10/1979  Haynes et al. ..................... 428/389
4,330,337   5/1982  Graham ............................. 106/135

OTHER PUBLICATIONS

"Organofunctional Silanes–A Profile" 5/83 p. 26, Union Carbide Corporation, Danbury, CT. 06817

Primary Examiner—Prince E. Willis
Assistant Examiner—John F. McNally
Attorney, Agent, or Firm—Ronald C. Hudgens; Greg Dziegielewski; Patrick P. Pacella

[57] ABSTRACT

An aqueous size composition is disclosed. The size composition is intended for glass fibers produced for carding and blending. The size contains polyvinyl alcohol and an antistatic agent which yields a firm forming tube from which yarn may be removed from the inside. The yarns have the advantage of being able to be cut into short lengths which disperse well without disintegrating.

8 Claims, No Drawings

SIZE COMPOSITIONS FOR GLASS FIBERS

TECHNICAL FIELD

This invention relates to size composition for glass fibers. The size compositions are intended for glass fibers produced for carding and blending.

BACKGROUND ART

Generally, a yarn is made by carding short lengths of glass fiber and then spinning the carded fibers. The short lengths of support fiber may be mixed in with the short lengths of glass fiber before carding. A reinforcing strand may be buried in the yarn during spinning or during a subsequent twisting step. The support fiber preferably should be flexible. The resulting yarn, or goods made therefrom, can be used in many applications. For example, these filaments can simply be twisted together to obtain a plain or twisted yarn, useable in the manufacture of cloth, braid, cord, etc.

DISCLOSURE OF THE INVENTION

This invention provides a yarn that yields a firm forming tube from which yarn may be removed from the inside, cut into short lengths which will disperse to individual filaments when processed through a card without disintegrating to very short fibers. The size also provides for fiber to metal lubrication and fiber to fiber cohesion which allows for processing into an integral web. The fiber forming size of this invention consists of polyvinyl alcohol and an antistatic agent in an aqueous composition.

This invention is utilized by having the surface of glass strands in contact with the residue formed by removing water from an aqueous composition of the alcohol, antistatic and a lubricant system.

BEST MODE OF CARRYING OUT THE INVENTION

The fiber forming size may be applied by apron or roll applicator to various diameter fibers. The size has the following chemical formula, by weight percent;
0.1–0.5 amine stearate
0.75–2.0 polyvinyl alcohol
1.0–4.0 phosphate ester
1.5–6.0 glass fiber lubricant
1.5–5.0 antistatic agent
balance: water Various additives may also be used to achieve special properties such as: silanes, fiber cohesion improvement—Polysorbitan Monostearate, Soya or Castor oil derivitives, mineral oils, etc.

Preferably, this size of this invention has a formula represented in percent, by weight of:
0.1–0.5 tetraethylene pentamine stearate
1.0–2.0 polyvinyl alcohol
1.0–3.0 sodium salt of a phosphate ester
1.5–5.0 a fatty acid ester lubricant
2.5–5.0 ethoxylated fatty acid amine condensate antistatic agent
balance: water The best mode of this invention has a formulation represented in percent, by weight of:
0.14: tetraethylene pentamine stearate: K-12 from Owens-Corning Fiberglas
1.0: polyvinyl alcohol: Gelvatol 20/30 from Monsanto
1.1: sodium salt of a phosphate ester: Gafac GB520 from GAF
1.7: butyl stearate lubricant: from Polymer Industries
3.0: antistatic agent Packstat S: from Tarheel State Chemicals
1.0: gamma-aminopropyltriethoxy silane: A 1100 from Union Carbide
92.06: water Mixing Procedure:
1. Place about ½ total amount of water required in a clean, jacketed tank equipped with a propellor-type mixer.
2. Slowly add Gelvatol 20/30 to water in tank with good agitation and heat to 180° F.
3. Cool to 150°–155° F.—add K-12 and continue agitation for ten minutes. Cool to 100°–110° F.
4. Premix #1
   A. Weigh Gafac GB520 and lubricant into a clean container equipped with a high speed propellor type mixer.
   Note: GB520 is a semi-solid at room temperature and should be warmed slightly to clear of cloudiness to make this premix.
   B. Slowly add tap water (70° to 100° F.) to the above blend, using good agitation. (Approximately 35 lb water for a 50-gallon final mix.) The emulsion will become like oatmeal and thin out with further addition of water. Continue mixing until all particles are dispersed.
5. Add Premix #1 to main mix.
6. Add Packstat S to main mix.
7. Weight A-1100 into a clean, dry container and add an equal amount of cold (70° to 100° F.) water. Allow to become clear and add to main mix.
8. Bring to final volume with tap water (70° to 100° F.).

Properties:
1. Store and use at ambient temperatures.
2. Solids 4.5±0.2.
3. pH 9.8±0.2.

Upon observation, this invention provides a yarn that yields a firm forming tube from which yarn may be removed from the inside, cut into short lengths which will disperse to individual filaments when processed through a card without disintegrating to very short fibers. The size provides fiber to metal lubrication, fiber to fiber cohesion which allows for processing into an integral web.

The following control was run according to the previously described mixing procedure and compared to the best mode of this invention.
0.14: tetraethylene pentamine stearate: K-12 from Owens-Corning Fiberglas
0.6: polyvinyl alcohol: Gelvatol 20/30 from Monsanto
1.1: sodium salt of a phosphate ester: Gafac GB520 from GAF
1.7: butyl stearate lubricant: from Polymer Industries
1.0: antistatic agent Packstat S: from Tarheel State Chemicals
1.0: gamma-aminopropyltriethoxy silane: A 1100 from Union Carbide
94.5: water The control contained less polyvinyl alcohol and less antistatic than the best mode.

Upon observation, the control did not handle well when yarn was removed from the inside of a forming tube. Filaments that were sized with the control disintegrated when the filaments were cut into short fibers. Handlability of filaments sized with the control during carding generally was poor when compared to filaments sized with the best mode of this invention.

INDUSTRIAL APPLICABILITY

Glass fibers used in the practice of this invention can be "E" glass fibers, well known to those skilled in the art; such fibers are described in U.S. Pat. No. 2,334,961.

Strands of glass fibers are produced by pulling several hundred or more tiny molten streams of glass which issue from holes in the bottom of a molten glass tank over a size applying apron to a gathering shoe which groups the fibers together into a strand. This strand then proceeds to a traverse mechanism and winding drum which provides the pulling action which attenuates the molten glass and coils the strand into a package. The fibers are individually separated at the time that they pass over the size applicator, so that the surfaces of the fibers are substantially completely coated before they are drawn together into a strand. This size acts as a lubricant which separates the individual filaments, and if the filaments are not separate by the size, they will scratch each other and break as they are flexed and drawn over guide eyes in the subsequent twisting, meaning and finishing operations.

Manufacturing comprises the following steps:

"Opening", in which balls of raw material (balls of glass fibre or of support fibre) are unpacked and loosened to separate the fibres from one another;

"Carding", in which the mixture is carded on a "spinning carder", i.e., a carding machine supplying roving from the carding web by dividing the web into strips using a set of straps and dividing cylinders, with each of the strips being agglomerated by a friction device, and then winding the strip of roving onto a bobbin; and "Spinning", in which the fibres are spun and twisted on a continuous ring spinner of conventional type.

The yarn thus obtained is then woven, braided or twisted depending on the type of product required, (cloth, braid or cord).

I claim:

1. A glass fiber aqueous size composition consisting essentially of, by weight percent:
   0.1–0.5 amine stearate
   0.75–2.0 polyvinyl alcohol
   1.0–4.0 phosphate ester
   1.5–6.0 a fatty acid ester lubricant
   1.5–5.0 ethoxylated fatty acid amine condensate antistatic agent
   balance: water to make 100% of the composition.

2. A composition according to claim 1 including a silane.

3. An aqueous size composition consisting essentially of, by weight percent:
   0.1–0.5 tetraethylene pentamine stearate
   1.0–2.0 polyvinyl alcohol
   1.0–3.0 sodium salt of a phosphate ester
   1.5–5.0 a fatty acid ester lubricant
   2.5–5.0 ethoxylated fatty acid amine condensate antistatic agent
   balance: water to make 100% of the composition.

4. A composition according to claim 3 including by weight percent 0.5 to 5.0 of a silane.

5. An aqueous size composition consisting essentially of by weight percent:
   0.14: tetraethylene pentamine stearate
   1.0: polyvinyl alcohol
   1.1: sodium salt of a phosphate ester
   1.7: butyl stearate lubricant
   3.0: ethoxylated fatty acid amine condensate
   1.0: gamma-aminopropyltriethoxy silane
   92.06: water to make 100% of the composition.

6. A plurality of filaments, at least a portion of the filaments' surfaces being in contact with the residue produced by evaporating water from an aqueous size composition consisting essentially of by weight percent:
   0.1–0.5 amine stearate
   0.75–2.0 polyvinyl alcohol
   1.0–4.0 phosphate ester
   1.5–6.0 a fatty acid ester lubricant
   1.5–5.0 ethoxylated fatty acid amine condensate antistatic agent
   balance: water to make 100% of the composition.

7. A plurality of glass fiber filaments, at least a portion of the filaments' surfaces being in contact with the residue produced by evaporating water from an aqueous size composition consisting essentially of by weight percent:
   0.1–0.5 tetraethylene pentamine stearate
   1.0–2.0 polyvinyl alcohol
   1.0–3.0 sodium salt of a phosphate ester
   1.5–5.0 a fatty acid ester lubricant
   0.5–5.0 silane
   2.5–5.0 ethoxylated fatty acid amine condensate
   balance: water to make 100% of the composition.

8. A plurality of textile glass fiber filaments, at least a portion of the filaments' surfaces being in contact with the residue produced by evaporating water from an aqueous size composition consisting essentially of by weight percent:
   0.14: tetraethylene pentamine stearate
   1.0: polyvinyl alcohol
   1.1: sodium salt of a phosphate ester
   1.7: butyl stearate lubricant
   3.0: ethoxylated fatty acid amine condensate
   1.0: gamma-aminopropyltriethoxy silane
   92.06: water to make 100% of the composition.

* * * * *